United States Patent
Novoa et al.

(10) Patent No.: US 6,493,824 B1
(45) Date of Patent: Dec. 10, 2002

(54) SECURE SYSTEM FOR REMOTELY WAKING A COMPUTER IN A POWER-DOWN STATE

(75) Inventors: Manuel Novoa, Houston, TX (US); Adrian Crisan, Cypress, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/253,637

(22) Filed: Feb. 19, 1999

(51) Int. Cl.[7] .............................. H04L 9/12; H04L 9/18
(52) U.S. Cl. ...................... 713/162; 709/203; 709/208; 709/217; 709/220; 709/228; 713/160; 713/161; 713/178; 713/179
(58) Field of Search ................................ 709/250, 245, 709/229, 225; 713/200, 201

(56) References Cited

U.S. PATENT DOCUMENTS

| | | | |
|---|---|---|---|
| 5,634,073 A | | 5/1997 | Collins et al. ............... 395/825 |
| 5,680,547 A | | 10/1997 | Chang .................... 395/200.01 |
| 5,727,221 A | | 3/1998 | Walsh et al. ................. 395/750 |
| 5,751,951 A | | 5/1998 | Osborne et al. ......... 395/200.8 |
| 5,802,305 A | | 9/1998 | McKaughan et al. .. 395/200.57 |
| 5,826,015 A | * | 10/1998 | Schmidt |
| 5,915,119 A | * | 6/1999 | Cone |
| 5,938,771 A | * | 8/1999 | Williams et al. |
| 6,119,228 A | * | 9/2000 | Angelo et al. ............... 713/178 |
| 6,131,167 A | * | 10/2000 | Cruz |
| 6,286,111 B1 | * | 9/2001 | Snover |
| 6,292,831 B1 | * | 9/2001 | Cheng |
| 6,311,276 B1 | * | 11/2001 | Connery et al. |

OTHER PUBLICATIONS

IBM, WakwOn Lan——an Administrator's perspective, IBM White paper, 1997.*
SCYLD Computing, Corporation, Using Wake–On–LAN with Linux, Http://www.SCYld.com/expert/wake–on–lan, 1999–2002.*

* cited by examiner

*Primary Examiner*—Gail Hayes
*Assistant Examiner*—Taghi T. Arani
(74) *Attorney, Agent, or Firm*—Conley, Rose & Tayon, P.C.; Michael F. Heim; Daniel J. Krueger

(57) ABSTRACT

A secure system and method is provided for remotely waking a computer from a power down state. In one embodiment, a network interface card receives incoming data packets via a network connector. A control module is coupled to the network connector and is configured to search the incoming packets for a wake-up pattern. The control module also verifies that the packet's destination address matches the destination address of the network interface card. If the destination addresses match and a wake-up pattern is found, the control module decrypts an encrypted value from the incoming packet and compares the result to an expected value. A successful comparison causes the control module to assert a signal to wake up the host computer. Preferably, a standard public/private key pair encryption scheme is used, and the source of the data packet encrypts the expected value with a private key. All computers which may receive wake-up packets are provided with a public key with which to decrypt values contained in a security field of any wake-up packets. A successful decryption serves to certify that the wake-up packet was transmitted from an authorized source. For added security, the expected value and public/private keys may be changed on a regular basis, or even every time a valid wake-up packet is received. The new value may be provided in the wake-up packet, to be stored by the network card for the next use.

11 Claims, 3 Drawing Sheets

SECURE SYSTEM FOR REMOTELY WAKING A COMPUTER IN A POWER-DOWN STATE

BACKGROUND OF THE INVENTION

1. Field of the Invention

The present invention relates generally to network computing systems, and more particularly, to a secure method for remotely waking up a computer on a network.

2. Background of the Invention

Computer networks are commonly used in offices or corporate environments to interconnect personal computers. Well-known local area networks (LANs), such as Ethernet, Token Ring, and ARCnet, are widely used to interconnect a group of computers and other devices that are dispersed over a relatively limited area, such as an office or building, and new LANs continue to be developed. These local area networks provide an efficient and economical way for personal computers to share information and peripherals.

Of course, computer networks are not limited to the confines of an office or building. Smaller networks are commonly interconnected into wide area networks (WANs), such as the Internet, to provide a communications link over a larger area. The Internet is actually a collection of networks that share the same namespace (a set of names in which all names are unique) and use the well-known transmission control protocol/internet protocol (TCP/IP). The Internet currently connects over four hundred networks and tens of thousands of nodes in over forty-two countries. It is estimated that the Internet is now accessed by more than 10 million people every day.

As is well known in the art, the transmission of data packets across networks is governed by a set of rules called "transport protocols". In order for two computers in a local area network to communicate with one another, each computer must use the proper transport protocol for the particular network. During the last decade, many different transport protocols have evolved for use in different networks. For example, TCP/IP is the transport protocol widely used in UNIX based networks and with Ethernet 802.3 LANs; IPX/SPX is the transport protocol used by Novell Corporation's NetWare developed by IBM to operate underneath Microsoft's NetBIOS network interface; DECnet is the transport protocol used by Digital Equipment Corporation for linking computer systems to DECnet-based networks; AppleTalk is the transport protocol developed by Apple Computer, Inc. for linking systems to Apple Macintosh network systems; and XNS is the transport protocol developed by Xerox Corporation that was used in early Ethernet networks. The transport protocols, which are all well known in the art, are often implemented as software drivers which can be loaded into and out of a computer system.

In order to connect to a network, a computer is usually provided with one or more network interface cards (NICs) that provide a data link to the network. Each network interface card has a unique address, referred to herein as its "destination address", which enables each computer to be individually addressed by any other computer in the network. The destination address is typically, but not always, a 12 digit hexadecimal number (e.g., 00AA00123456) that is programmed into memory located on the network interface card and is generally hidden from the user's view. Users are not expected to know and remember the destination address of every computer in the network. Instead, every computer generally has a computer name (commonly corresponding to the user's name and/or machine location) that is more widely known. When a user desires to send a message to another computer, the transport protocol in the network is responsible for converting the name of the other computer into the corresponding destination address to establish a communications link between the two computers.

Because wide area networks often include a collection of a wide variety of machines, organizations and individuals, these networks must provide the means to exchange data between dissimilar machines and across many different transport protocols. Each transport protocol has its own version of addressing information that enables it to exchange electronic mail, data files, programs, etc. between one LAN and another LAN. As a data packet is transmitted across different networks, the addressing information for one transport protocol is replaced by the addressing information for the next transport protocol. Over the Internet, this LAN addressing information is abstracted from the Internet address.

The address of an individual, computer, or organization on the Internet has several layers or components including the domain name or user name, the underlying identifiers used by the transport protocol(s) that govern the data exchange, and the actual destination address. Each transport protocol is designed to extract the appropriate destination address to ensure that each message packet is routed to its intended recipient.

To illustrate the distinctions between the various layers of addressing information, consider an individual computer user in Atlanta that wishes to send an e-mail message to a destination computer in Seattle where the computer in Atlanta is connected to an Internet service provider and the computer in Seattle is connected to a corporate local area network. Generally, the user in Atlanta will know, or can readily obtain, the recipient's computer (e.g., www.recipient.com), but will not know the recipient's Internet address or actual destination address. Nonetheless, the transport protocols will abstract the destination address from the message packet as it is transmitted across the network.

Therefore, the user in Atlanta will simply type the recipient's computer name, www.recipient.com, as the address of the destination computer. The message packet will be sent via the Internet, where the TCP/IP transport protocol will convert the computer name into a more primitive Internet address, which is a 32-bit value that identifies the host's network ID and host ID within the network, e.g., 123.234.5.6. The message packet is then routed to the corporate LAN in Seattle, where a component in the LAN, typically a network router, switch, or server, converts the Internet address into the destination address of the recipient's network interface card, e.g., 00AA00123456.

Meanwhile, the network interface card of the destination computer is designed to continually monitor incoming packets over the network. When the network interface card detects an incoming packet containing its destination address, the network interface card will determine that it is the intended recipient of the packet, and will forward information content of the packet to the destination computer's core, thereby completing the communications link.

In normal operations, in which both the source computer and the destination computer are operating in full power mode, all of these address conversions occur automatically and completely invisible to the user, and the communications link is readily established between the two computers. However, efforts are now being made to extend the use of network computing to power management applications, in which one or more of the computers may be operating in a low power mode. In particular, there is increasing demand for power management systems that minimize the energy consumption of computer systems, yet still allow the possibility for receiving remote communications from other computers via a network. These power management systems must provide a mechanism for remotely "waking" a computer system from a low power mode to permit the computer system to receive network communications.

Generally stated, "power management" refers to a computer system's ability to conserve or otherwise manage the power that it consumes. Although power management concerns were originally focused on battery-powered portable computers, these concerns now extend to AC-powered "desktop" computer systems as well. In particular, government initiatives encourage computer manufacturers to develop energy-efficient computers.

Power management techniques include the ability to dynamically power down a computer or certain components within a computer when they are not in use, thereby conserving energy. A computer in this condition is referred to herein as being in a "power down" state. Power is then restored to the computer or components when they are required for use. This process is often referred to as "waking" the computer.

There are many ways in which a computer may exist in the power down state. Examples include hard off (power is disconnected), soft off (power is supplied only to components which monitor activity external to the system), hibernated power state (contents of memory are stored on disk and current state of computer is preserved while power consumption is reduced to a minimum level), suspend mode (all central processor activities are halted, but power to memory is maintained and dynamic RAM is refreshed), and sleep mode (the clock signal is reduced or halted to some or all of the system components during periods of inactivity). The sleep and suspend modes may each be invoked at various levels, depending on the particular implementation of these modes, and recovery from these modes is implementation specific.

In an effort to standardize power management using a computer's operating system, Intel, Microsoft, and Toshiba have collaborated to produce the Advanced Configuration and Power Interface (ACPI) specification. Under ACPI, a computer system can be placed in one of five graduated reduced-power system states, which do not necessarily correspond (in functionality or in name) to the power down modes recited above. Nevertheless, these states also represent power down states of a computer.

When a computer is in a power down state, it may be configured to awaken if activity is detected, e.g. movement of a mouse or actuation of a power switch. The source of the triggering activity may come from a local mechanism (i.e. a switch or sensor of any kind such as a power switch, a reset switch, a pressable key, a pressure sensor, a mouse, a joystick, a touch pad, a microphone, or a motion sensor), or the trigger source may be remote. The ability to remotely awaken a computer increases its usability and maintainability. For example, a user can remotely retrieve files even when the computer was powered down, and a system administrator can perform system maintenance after hours without needing to physically visit each computer.

There are several existing power management systems which are designed to operate in a network environment. In one system for waking a computer from a local area network, a remote wake frame known as a "magic packet" is defined that includes the destination address repeated 16 times consecutively anywhere within the packet. While the computer is in the power down state, its network interface card continually monitors all incoming message packets for one that has its destination address repeated 16 times. When the network interface card detects an incoming packet with this address sequence, the network interface card asserts a signal to wake the rest of the computer and then start the operating system. The operating system may optionally be started up in an "administration mode" with restricted access (e.g. the user may be locked out for the duration of a maintenance task).

In another prior system for waking a computer from a local area network, the computer's network interface card is provided with a list of packets stored in memory. When an incoming packet of information is transmitted to a computer in the power down state, the network interface card compares the incoming packet to the list of packets that it has stored in memory. If the incoming packet matches one of the packets in the list of packets, then a signal is issued to wake the computer. Otherwise, the incoming packet is discarded and the sleeping computer is not awakened.

Typically, upon receiving a "wake-up" packet, the network interface card asserts an interrupt or reset signal to awaken the computer. Depending on the power down state and the specific power management implementation, the computer responds by restarting a clock signal, restoring a memory state, performing an initialization process, or otherwise returning the system to a full power mode.

Security is an important consideration in computer networks, and the prior network-aware power management systems do not include any provisions for security. Computers in a power down state may prove to be vulnerable links in certain computer networks. For example, some proposed computer systems will respond to wake-up packets by retrieving their initial executable programs via the network. Skilled saboteurs may be able to use this system feature to gain access to a network or to simply cause mischief. Indeed, simply broadcasting wake-up packets in many existing networks can frustrate a company's attempts to reduce power consumption.

Consequently, it is desirable for a computer system in a power down state to be able to discriminate between authorized wake-up packets and unauthorized wake-up packets.

SUMMARY OF THE INVENTION

Accordingly, there is provided herein a secure system and method for remotely waking a host computer from a power down state. In one embodiment, a network interface card receives incoming data packets via a network connector. A control module is coupled to the network connector and is configured to search the incoming packets for a wake-up pattern. The control module also verifies that the packet's destination address matches the destination address of the network interface card. If the destination addresses match and a wake-up pattern is found, the control module decrypts an encrypted value from the incoming packet and compares the result to an expected value. A successful comparison causes the control module to assert a signal to wake up the host computer. Preferably, a standard public/private key pair encryption scheme is used, and the source of the data packet encrypts the expected value with a private key, All computers which may receive wake-up packets are provided with a public key with which to decrypt values contained in a security field of any wake-up packets. A successful decryption serves to certify that the wake-up packet was transmitted from an authorized source. For added security, the expected value and public/private keys may be changed on a regular basis, or even every time a valid wake-up packet is received. The new value may be provided in the wake-up packet, to be stored by the network card for the next use.

The present invention also contemplates a method which comprises: (i) receiving a data packet from a network; (ii) comparing a destination address of the data packet to a destination address of a network interface card; (iii) determining if a wake-up pattern is present in the data packet; (iv) decrypting an encrypted value from the data packet to obtain a decrypted value; and (v) asserting a wake-up signal if the destination addresses match, a wake-up pattern is present, and the decrypted value matches an expected value. Preferably, the encrypted value is produced according to a standard public key/private key encryption scheme.

BRIEF DESCRIPTION OF THE DRAWINGS

A better understanding of the present invention can be obtained when the following detailed description of the preferred embodiment is considered in conjunction with the following drawings, in which.

Figure 1:
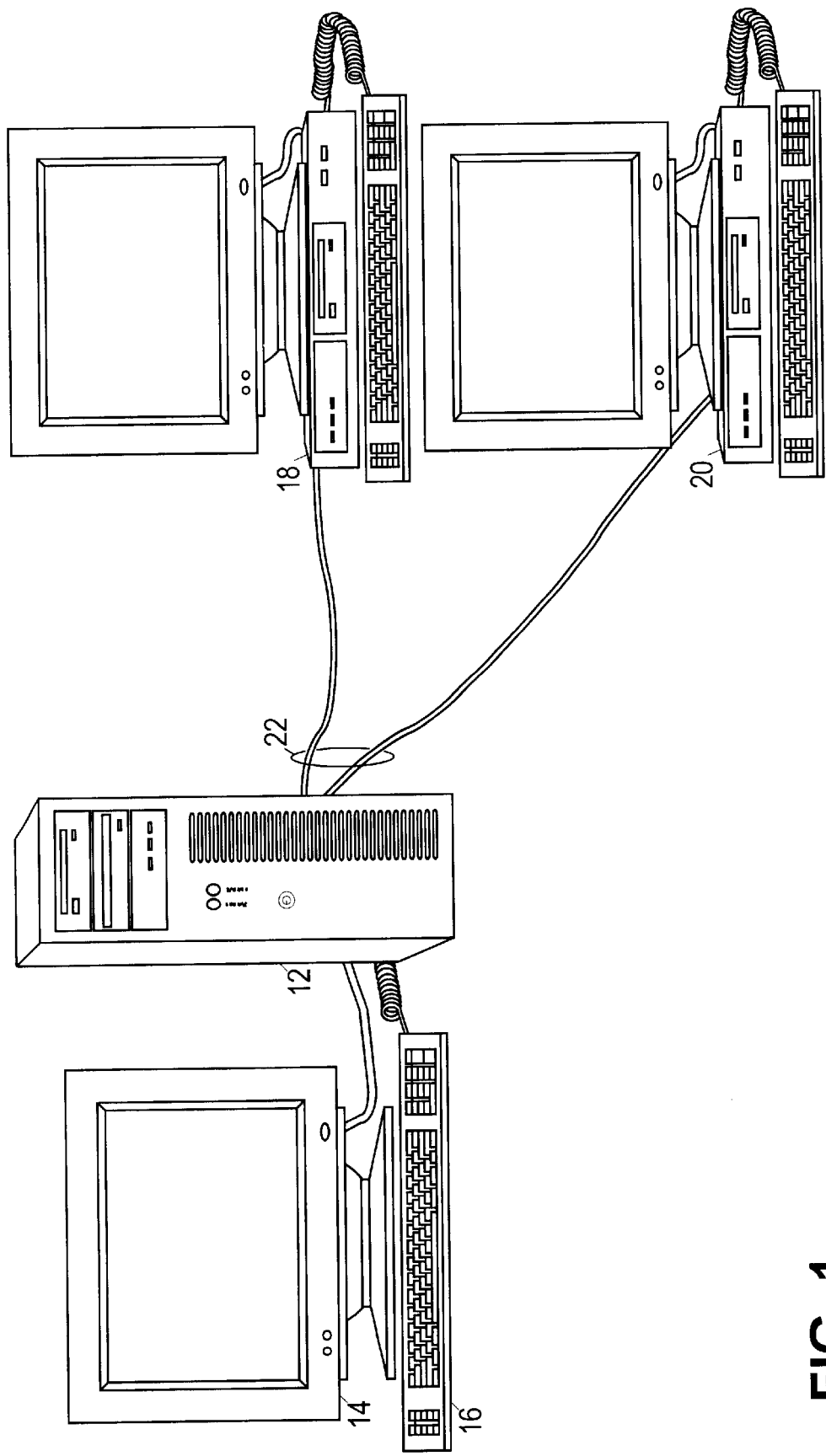
FIG. 1 is an illustrative diagram of a simple computer network which supports transmission of wake-up packets.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

In addition, certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF PREFERRED EMBODIMENTS

Turning now to the figures, FIG. 1 shows an example of a computer network embodying a preferred embodiment of the invention, in which a central server 12 is coupled to a first computer 18 and a second computer 20 by network connections 22. Computers 18, 20 may preferably be "client" computers. Although a client/server configuration is shown, the computer network may also be an enterprise network, a peer network, or any other suitable network configuration.

A system administrator operating at a terminal 14 with input device 16 can cause transmission of a network data packet to first and second computers 18, 20 to instruct either of the computers 18, 20 to awaken. Advanced Micro Devices (AMD) has proposed a "Magic Packet(™) Technology" that supports this ability, and Microsoft has patented a "packet-matching" method that also supports this ability. In essence, network interface cards in computers 18, 20, after being placed in a remote boot mode, continually scan incoming data packets for a predetermined sequence even when the computers are in a power down state. Upon detection of a packet that qualifies as a wake-up packet, the network interface card sends a signal to awaken the computer. In one embodiment, the network interface card alerts a power management module to power up the computer.

It can be appreciated that the ability to remotely awaken a computer provides certain advantageous capabilities. For example, a system administrator is able to perform system after-hours maintenance of each of the computers in the network from a central location. The administrator may further be provided with the ability to boot each of the computers from a master copy of the operating system as part of the system maintenance. Examples of when this could be desirable include: virus scanning, and executing automated maintenance software. However, these capabilities may also represent a security vulnerability. The preferred system ensures that only authorized users are able to remotely awaken a computer from a power down state.

Figure 2:
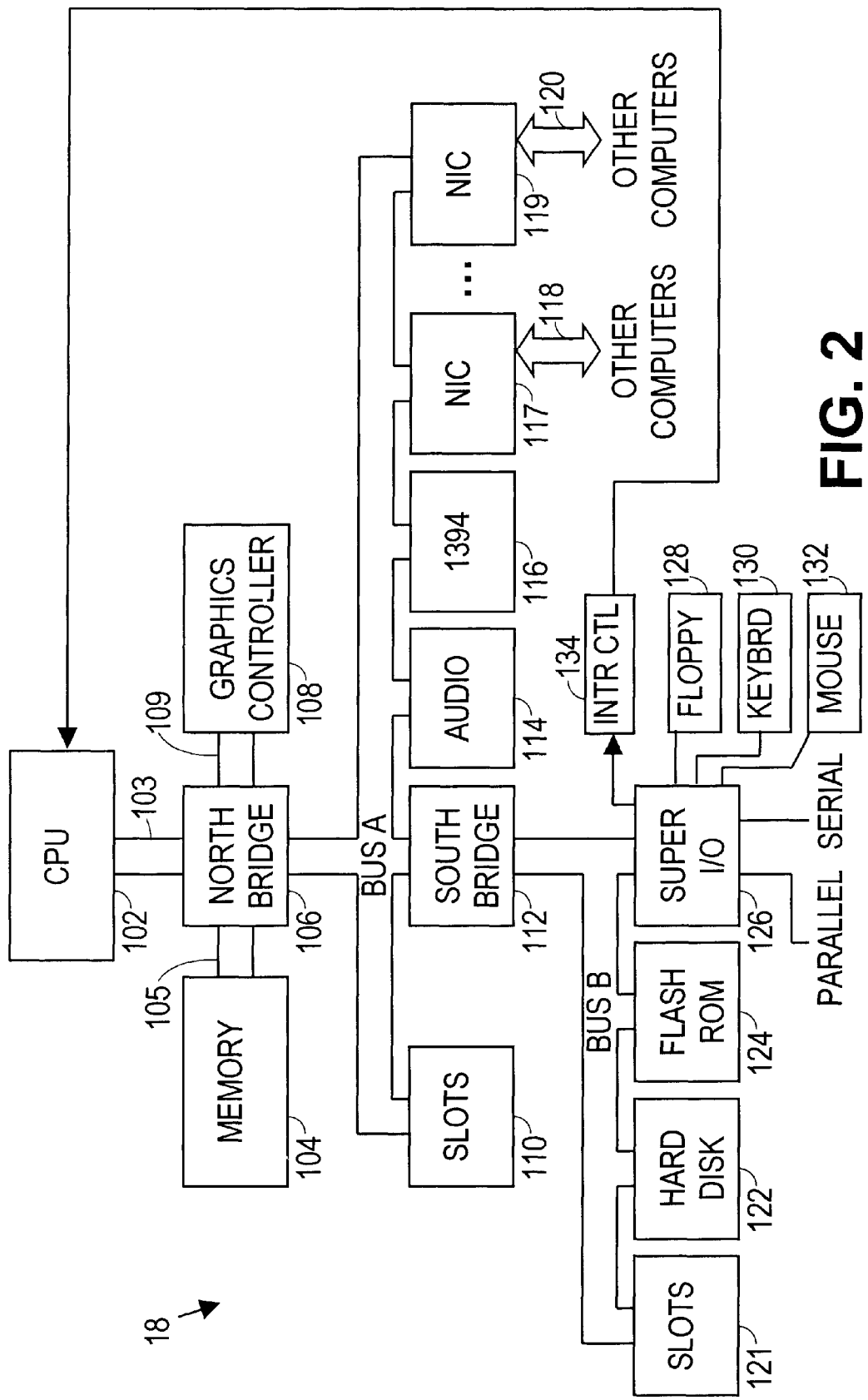
FIG. 2 is a block diagram of a computer system embodying a preferred embodiment of the present invention.

Referring now to FIG. 2, a representative computer system is illustrated. It is noted that many other representative configurations exist and that this embodiment is described for illustrative purposes. For the following discussion, the computer system of FIG. 2 is assumed to represent client computer 18, but one of skill in the art will recognize that the invention may be implemented as part of any computer connected to a network. The computer system 18 of FIG. 2 includes a CPU 102 coupled to a bridge logic device 106 via a CPU bus 103. The bridge logic device 106 is sometimes referred to as a "North bridge" for no other reason than it often is depicted at the upper end of a computer system drawing. The North bridge 106 also couples to a main memory array 104 by a memory bus 105, and may further couple to a graphics controller 108 via an accelerated graphics port (AGP) bus 109. The North bridge 106 couples CPU 102, memory 104, and graphics controller 108 to each other and to various peripheral devices in the system through a primary expansion bus (BUS A) such as a PCI bus or an EISA bus. Various components that comply with the bus protocol of BUS A may reside on this bus, such as an audio device 114, an IEEE 1394 interface device 116, and a network interface card (NIC) 117. NIC 117 is coupled to a network 118 for communication with other computers. The system may include more than one network interface, as indicated by NIC 119. NIC 119 is shown coupled to a second network 120 for communication with other computers. The above components may be integrated onto the motherboard as presumed by FIG. 2, or they may be plugged into expansion slots 110 that are connected to BUS A.

If other, secondary, expansion buses are provided in the computer system 18, as is typically the case, another bridge logic device 112 is used to couple the primary expansion bus (BUS A) to the secondary expansion bus (BUS B). This bridge logic 112 is sometimes referred to as a "South bridge" reflecting its location vis-a-vis the North bridge 106 in a typical computer system drawing. The South Bridge 112 commonly includes an interrupt controller 134, which is shown separately in FIG. 2. An example of such bridge logic is described in U.S. Pat. No. 5,634,073, assigned to Compaq Computer Corporation. Various components that comply with the bus protocol of BUS B may reside on this bus, such as hard disk controller 122, Flash ROM 124, and Super I/O controller 126. Slots 121 may also be provided for plug-in components that comply with the protocol of BUS B.

The Super I/O controller 126 typically interfaces to basic input/output devices such as a floppy disk drive 128, a keyboard 130, a mouse 132, a parallel port, a serial port, and, if desired, various other input switches such as a power switch and a suspend switch (not shown). The Super I/O controller 126 often includes a power management unit having the capability to handle power management functions such as reducing or terminating power to components such as the floppy drive 130, and blocking the clock signals that drive components such as the bridge devices 106, 112 thereby inducing a sleep mode in the expansion buses. The Super I/O controller 126 may further assert System Management Interrupt (SMI) signals to interrupt controller 134 (which in turn communicates the interrupt to the CPU 102) to indicate special conditions pertaining to input/output activities such as sleep mode. The SMI is simply a particular interrupt which is reserved for system management functions, but which is otherwise handled in much the same manner as any conventional interrupt.

The Super I/O controller 126 may incorporate a counter and a Real Time Clock (RTC) to track the activities of certain components such as the hard disk 122 and the primary expansion bus, inducing a sleep mode or reduced power mode after a predetermined time of inactivity. The Super I/O controller 126 may also induce a low-power suspend mode if the suspend switch is pressed, in which the power is completely shut off to all but a few selected devices. Exempted devices might be the Super I/O controller 126 itself and NIC 119. An exemplary Super I/O controller is described in U.S. Pat. No. 5,727,221, entitled "Computer system power management interconnection circuitry and systems" by inventors J. Walsh and W. Kau, which is hereby incorporated by reference.

Figure 3:
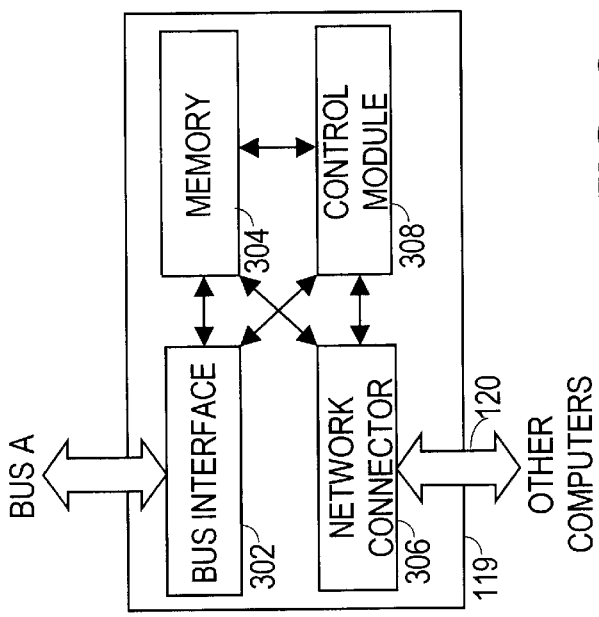
FIG. 3 is a block diagram of a preferred embodiment of a network interface card.

Referring now to FIG. 3, a block diagram illustrates the network interface card 119 in more detail. The network interface card 119 includes a bus interface 302 for connecting to the BUS A, and one or more network connectors 306 for connecting to a network such as the local area network 120 or a wide area network. The network connector 306 may comprise, for example, a conventional BNC connector assembly or an AUI connector assembly for connecting to an Ethernet or ARCnet network, or an RJ-45 connector assembly for connecting to an Ethernet or Token Ring network.

Network interface card 119 also includes memory 304 and a control module 308. The memory 304 is used to store the destination address of the network interface card 119. Memory 304 may additionally store a list of packets for which the network interface card 119 should listen while the host computer 18 is in a power down state. For one embodiment, the creation and use of this list of packets, is described in more detail in U.S. Pat. No. 5,802,305 by McKaughan et al. which is entitled "System For Remotely Waking A Sleeping Computer In A Power Down State By Comparing Incoming Packet To The List Of Packets Storing On Network Interface Card", and which is hereby incorporated by reference.

Network interface card 119 further includes control module 308 which screens the packets received from the network 120. During normal operations, the control module 308 merely examines the packet's destination address, discards those packets having destination addresses which do not match the network interface card's address, and accepts those packets having destination addresses that do match.

When the host computer 18 is in a power down state, the control module 308 examines the packet's destination address, determines if the packet is a wake up packet, and determines if the wake up packet is valid (i.e. sent by an authorized source) or invalid (i.e. sent by an unauthorized source). The order of these operations can be rearranged.

Valid wake up packets constructed in accordance with a preferred embodiment comprise (1) an address field, (2) a wake up pattern, and (3) a security field. The address field contains an address value that matches the destination address of the network interface card. When the packet has only a single destination, the address value equals the destination address of the network interface card. However, as in the case of a broadcast packet which targets multiple computers, the address value can match the destination address without necessarily being equal to the destination address.

In systems that utilize AMD's Magic Packet™ technology, the wake up pattern includes 16 consecutive repetitions of the network interface card's destination address somewhere in the packet. Other systems may use other wake up patterns, such as any arbitrary pattern provided in a list of suitable wake up packets per U.S. Pat. No. 5,802,305 which was incorporated above.

The security field is included in the packet, preferably subsequent to the wake up pattern. The security field includes an encrypted value which is processed by the control module 308 to determine if a wake up packet is valid. In a preferred embodiment, a public/private key encryption scheme is used, with the public key being stored in memory 304, and the private key being controlled and kept secure by a system administrator or other authorized user(s). The control module 308 decrypts the encrypted value using the public key. If the decrypted value matches an expected value, the wake up packet is determined to be valid, and the control module 308 issues a signal to awaken the computer. Otherwise, the packet is discarded.

A wide variety of candidates exist for the expected value. In one implementation, the expected value is an arbitrary, predetermined value. In another implementation, the expected value is the network interface card's destination address. In a third implementation, the expected value is the current date. In this third implementation, the control module 308 may include a real time clock for determining the current date. In a fourth implementation, the expected value is a checksum of some portion of the packet. In this implementation, the control module 308 calculates the checksum from the received packet and compares the calculated checksum to the decrypted value. In this fourth implementation, the security field may take the form of a digital certificate, e.g. an X.509 digital certificate which can provide desirable extensions such as support for multiple digital signatures. This may be desirable when it's necessary to know that the company approved the action by the system administrator. In this case, both a company administrator and the system administrator digitally sign the wake-up packet.

In one particular embodiment, a valid wake up packet also includes a public key for use by the control module 308 in any subsequent determinations of wake up packet validity. Upon determining that a wake up packet is valid, the control module 308 stores the new public key in memory 304 in addition to awakening the computer.

Figure 4:
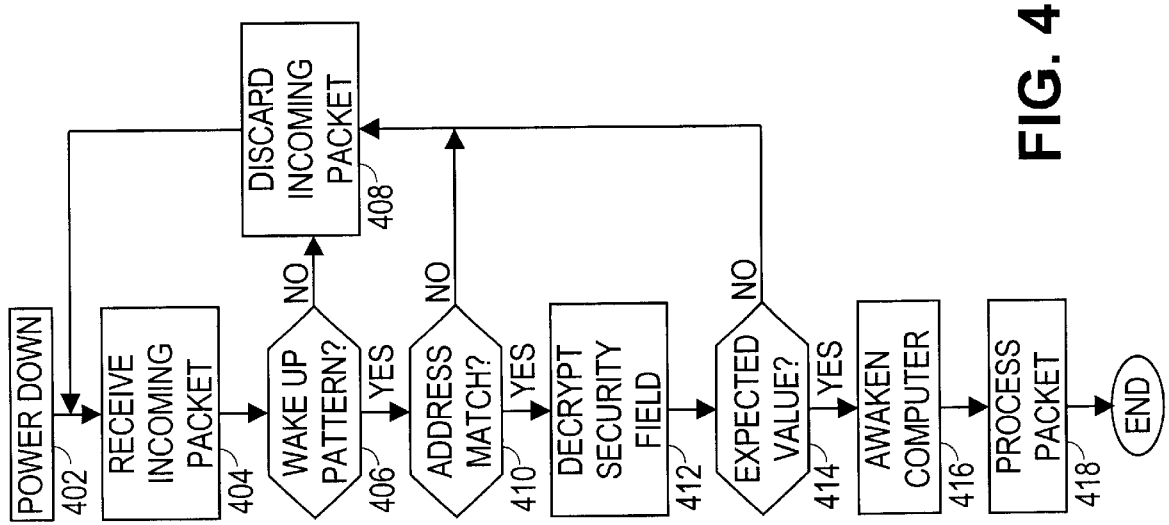
FIG. 4 illustrates a method for waking a remote computer from a power down state.

Referring now to FIG. 4, a method for waking a computer from a power down state is shown. In order to wake a remote computer from the network, the remote computer must first be placed into a power down state in which power to the network interface card is maintained. At step 402, the remote computer is placed into a power down state. The power down process may be initiated by the user of the computer, e.g., by pushing a suspend button on the computer, or, if the remote computer is a portable computer system, by closing the lid. The power down process may also be initiated programmatically by the remote computer. In the power down state, the network interface card possesses a destination address and one or more wake up patterns that it scans incoming packets for. While the remote computer is in the power down state, its network interface card continually "listens" for incoming packets as it does in normal operation.

At step 404 the network interface card 119 of the remote computer detects an incoming packet over the network. At step 406 the control module 308 processes the incoming packet to determine if the packet includes a wake up pattern. If no wake up pattern is present, the incoming data packet is discarded in step 408, and the control module 308 returns to step 404 to receive the next incoming packet.

If a wake up pattern is present, then in step 410 the control module 308 verifies that the packets address field value matches the destination address of the network interface card 119. In this instance, the term "match" is not limited to equality, since a broadcast packet would have an address field value that matches the destination addresses of more than one of the network interface cards in the network. If the address field value does not match, the control module 308 discards the packet in step 408. Otherwise, the control module 308 decrypts the security field value in step 412.

Preferably, the security field value has been encrypted by an authorized source's private key. In a standard public key/private key encryption scheme, this means that the message can only be correctly decrypted by using the corresponding public key. If in fact the authorized source is the only one in possession of the private key, successful decryption using the public key ensures that the packet originated from the authorized source.

In step 414, the control module 308 determines if the decrypted security field value matches an expected value. If not, then the packet is invalid, and the control module 308 discards the packet in step 408. Otherwise, in step 416, the control module 308 issues a signal to awaken the computer via conventional mechanisms. Examples of these mechanisms include an interrupt signal to the CPU 102, or a reset signal to a power management unit in South bridge 112. The packet is then processed by the operating system in step 418, and the method is concluded.

Using the methods and systems of the preferred embodiment provides many useful benefits to users by permitting the use of energy-saving features of power management in a secure network environment while still allowing communications between computers in the network. For example, by using the methods and systems described herein, an authorized user can awaken client computers to make backups or perform system management during off-hours without requiring users to leave their computers on.

When multiple NICs are present in a host computer 18, the ability to perform a secure remote wake-up may be implemented in each NIC. This would enable a computer to be remotely and securely awakened from multiple, separate networks.

The present invention has been described in relation to particular embodiments which are intended in all respects to be illustrative rather than restrictive. Alternative embodiments will become apparent to those skilled in the art to which the present invention pertains without departing from its spirit and scope. For example, although the present invention has been described in accordance with a remote computer in a power down mode, it will be appreciated that the systems and principles described herein may also be useful in a computer that is operating in fall power mode by having the network interface card send an interrupt only when it receives a packet that has been determined to come from an authorized source. Moreover, the present invention has been described in accordance with waking a personal computer. However, the design described herein equally applies to any other computers, servers, network peripherals or network servers. Accordingly, the scope of the present invention is defined by the appended claims rather than the foregoing discussion.

What is claimed is:

1. A method for secure remote wake-up of a computer by a network interface card included in the computer, wherein the method comprises:

receiving a data packet from a network;

comparing a destination address included in the data packet to a destination address of the network interface card;

determining if a wake-up pattern is present in the data packet;

decrypting an encrypted value from the data packet to obtain a decrypted value; and asserting a wake-up signal if the destination addresses match, a wake-up pattern is present, and the decrypted value matches an expected value, wherein the expected value includes a current date;

retrieving a new encryption key included as part of the data packet if the destination addresses match, a wake-up pattern is present, and the decrypted value matches an expected value; and storing the new encryption key.

2. The method of claim 1, wherein the wake-up signal is an interrupt to a computer processor.

3. The method of claim 1, further comprising:

waking up the computer from a power down state in response to the wake-up signal.

4. The method of claim 1, further comprising:

creating the data packet with a wake-up pattern, wherein the creating includes:
encrypting the expected value using a private encryption key to produce the encrypted value; and
placing the encrypted value in a security field subsequent to the wake-up pattern; and transmitting the data packet on the network.

5. The method of claim 1, wherein the new encryption key is changed each time the computer is remotely awakened.

6. A network interface card which comprises:

a network connector configured to receive incoming packets;

a control module coupled to the network connector and configured to determine if an incoming packet includes a wake-up pattern, configured to compare a destination address included in the packet to a destination address of the network interface card, and configured to decrypt an encrypted value from a security field in the incoming packet to obtain a decrypted value, wherein the control module is further configured to assert a wake-up signal if the addresses match, a wake-up pattern is included in the packet, and the decrypted value matches an expected value; and a memory coupled to the control module and configured to store a public encryption key for decrypting the encrypted value, wherein the control module includes a real-time clock for determining the expected value.

7. The network interface card of claim 6, wherein the wake-up pattern comprises sixteen consecutive repetitions of the network interface card's destination address.

8. A networked computer system comprising:

a local computer;

a network coupled to the local computer to transport data packets generated by the local computer;

a remote computer coupled to the network to receive data packets generated by the local computer, wherein the remote computer comprises:

a central processing unit configurable to place the remote computer in a power down mode;

a network interface card coupled between the central processing unit and the network, wherein while the remote computer is in a power down mode, the network interface card is configured to examine a data packet received from the local computer for a wake-up pattern, configured to compare a destination address included in the received data packet to a destination address of the network interface card, and configured to decrypt an encrypted value from the received data packet to produce a decrypted value, wherein the network interface card is further configured to assert an interrupt to the central processing unit if the received data packet includes a wake-up pattern, the destination addresses match, and the decrypted value equals an expected value, wherein the expected value includes a current date, wherein the network interface card is further configured to retrieve and store a new encryption key included as part of the data packet if the destination addresses match, a wake-up pattern is present, and the decrypted value matches an expected value.

9. The networked computer system of claim 8, wherein the local computer generates a wake-up packet by encrypting the expected value using a private key according to a public key/private key encryption scheme.

10. The networked computer system of claim 8, wherein the central processing unit is configured to provide the network interface card with one or more suitable wake-up patterns as part of placing the remote computer in a power down mode.

11. A computer readable storage medium which stores software comprising:

a means for receiving a data packet from a network;

a means for comparing a destination address included in the data packet to a destination address of a network interface card;

a means for determining if a wake-up pattern is present in the data packet;

a means for decrypting an encrypted value from the data packet to obtain a decrypted value;

a means for asserting a wake-up signal if the destination addresses match, a wake-up pattern is present, and the decrypted value matches an expected value, wherein the expected value includes a current date; and a means for retrieving a new encryption key included as part of the data packet if the destination addresses match, a wake-up pattern is present, and the decrypted value matches an expected value; and a means for storing the new encryption key.

\* \* \* \* \*